United States Patent
Luo et al.

(10) Patent No.: US 10,324,813 B2
(45) Date of Patent: Jun. 18, 2019

(54) METHODS AND DEVICES FOR MULTI-LEVEL DATA PROTECTION IN A STORAGE SYSTEM

(71) Applicant: EMC IP HOLDING COMPANY LLC, Hopkinton, MA (US)

(72) Inventors: Yuan Luo, Shanghai (CN); Ning Xu, Shanghai (CN); Maxim Sichao Ma, Shanghai (CN); Qiu Shang, Shanghai (CN); Shaocong Liang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 15/382,830

(22) Filed: Dec. 19, 2016

(65) Prior Publication Data

US 2017/0185497 A1    Jun. 29, 2017

(30) Foreign Application Priority Data

Dec. 24, 2015 (CN) .......................... 2015 1 0983346

(51) Int. Cl.
G06F 11/20 (2006.01)
(52) U.S. Cl.
CPC ...... *G06F 11/2069* (2013.01); *G06F 11/2058* (2013.01)
(58) Field of Classification Search
CPC ............. G06F 11/2058; G06F 11/2069; G06F 11/2082
See application file for complete search history.

(56) References Cited

U.S. PATENT DOCUMENTS

| 7,225,307 | B2 * | 5/2007 | Micka | G06F 11/2058 711/161 |
| 7,437,598 | B2 * | 10/2008 | Zohar | G06F 11/2058 714/6.23 |
| 7,702,953 | B2 * | 4/2010 | Spear | G06F 11/2058 714/5.11 |
| 2015/0269043 | A1 * | 9/2015 | Wilson | G06F 11/3006 714/6.3 |

* cited by examiner

*Primary Examiner* — Joseph R Kudirka
(74) *Attorney, Agent, or Firm* — Krishnendu Gupta; Lesley Leonessa

(57) ABSTRACT

A method and apparatus for multi-level data protection in a storage system. The storage system comprises a first storage device, a second storage device, and a third storage device, the method comprising: establishing a synchronous replication session between the first storage device and the second storage device so as to synchronously replicate data in the first storage device to the second storage device; establishing an asynchronous replication session between the first storage device and the third storage device so as to asynchronously replicate the data in the first storage device to the third storage device; and recovering the asynchronous replication by establishing an asynchronous replication session between the second storage device and the third storage device in response to a failure of the first storage device.

18 Claims, 4 Drawing Sheets

METHODS AND DEVICES FOR MULTI-LEVEL DATA PROTECTION IN A STORAGE SYSTEM

RELATED APPLICATIONS

This application claim priority from Chinese Patent Application Number CN201510983346.2, filed on Dec. 24, 2015 at the State Intellectual Property Office, China, titled "METHOD AND APPARATUS FOR MULTI-LEVEL DATA PROTECTION IN STORAGE SYSTEMS," the contents of which is herein incorporated by reference in its entirety

FIELD

Embodiments of the present disclosure relate to a data storage system, and more specifically relate to methods and devices for multi-level data protection.

BACKGROUND

In a data storage system, a plurality of copies of data may be stored simultaneously so as to enhance security and availability of the data. For example, data may be replicated from one storage device to another storage device through a mirror view technology. Currently, data replication may be performed through synchronous replication or asynchronous replication.

Synchronous replication refers to a technology of generating, by a network attached storage (NAS), a plurality of synchronous data copies in a local area network (LAN) or Wide area network (WAN) via block replication technique. An advantage of synchronous replication is small time delay of data synchronous protection and a 0 recovery point objective (RPO). Therefore, a disaster event occurring at a production data center may not result in data loss; however, it can only work within a relative short distance (e.g., 10 KM). Therefore, synchronous replication is suitable for applications with a low recovery time objective (RTO).

Compared with synchronous replication, with the technique of asynchronous replication, there is a longer time delay before data is replicated to a secondary site. The asynchronous replication can support a longer distance. e.g., 100 KM.

Therefore, the synchronous replication and asynchronous replication have their own advantages and disadvantages and are applicable to different scenarios. In current storage systems, there have been no technical solutions to support co-existence of synchronous replication and asynchronous replication.

SUMMARY

In order to improve data protection, embodiments of the present disclosure provide a method and apparatus for data protection in a storage system.

Hereinafter, an overview of respective embodiments will be given to provide basic understanding on some aspects of various embodiments. The overview is not intended to identify main points of key elements or describe scope of various embodiments. Its only purpose is to present some concepts in a simplified way as a prelude for subsequent more detailed depiction.

A first aspect of the present disclosure provides a method for multi-level data protection in a storage system, the storage system comprising a first storage device, a second storage device, and a third storage device, the method comprising: establishing a synchronous replication session between the first storage device and the second storage device for synchronously replicating data in the first storage device to the second storage device; establishing an asynchronous replication session between the first storage device and the third storage device for asynchronously replicating the data in the first storage device to the third storage device; and recovering the asynchronous replication by establishing an asynchronous replication session between the second storage device and the third storage device in response to a failure of the first storage device.

In one embodiment, synchronously replicating data in the first storage device to the second storage device may comprise: synchronizing information in the first storage device about the asynchronous replication session between the first storage device and the third storage device to the second storage device; and the method further comprises: clearing, from the second storage device, part of information about the asynchronous replication session between the first storage device and the third storage device before establishing the asynchronous replication session between the second storage device and the third storage device.

In another embodiment, the clearing, from the second storage device, part of information about the asynchronous replication session between the first storage device and the third storage device may comprise: identifying a session signature of the asynchronous replication session between the first storage device and the third storage device from the data synchronously replicated to the second storage device, and clearing, from the second storage device, information about the asynchronous replication session indicated by the session identifier. In a further embodiment, the session signature may include a session identifier and a file system identifier, and clearing, from the second storage device, information about the asynchronous replication session indicated by the session identifier may comprise: clearing, from the second storage device, information about the asynchronous replication session indicated by the session identifier if the file system identifier included in the session signature matches an internal file system checkpoint identifier in a control path database that is imported from the first storage device into the second storage device.

In one embodiment, synchronizing information in the first storage device about the asynchronous replication session between the first storage device and the third storage device to the second storage device may comprise: synchronizing the information in the first storage device about the asynchronous replication session between the first storage device and the third storage device as part of data to the second storage device; or synchronizing the information in the first storage device about the asynchronous replication session between the first storage device and the third storage device as part of an internal file system checkpoint to the second storage device.

In another embodiment, establishing an asynchronous replication session between the second storage device and the third storage device may comprise: loading a file system to the second storage device; and establishing a file system-level asynchronous replication session between the second storage device and the third storage device.

In one embodiment, the method may further comprise: performing failover by exchanging roles of the first storage device and the second storage device during the synchronous replication session, in response to a failure of the first storage device; and during recovery of the first storage device from the failure, clearing control path database information related to the synchronous replication session from the first storage device and updating a configuration file of the first storage device so as to ensure that a file system loading process after reboot of the first storage device will not cause a rolling reboot of the system due to file system mismatch. In another embodiment, updating the configuration file of the first storage device may comprise: modifying a loading item of a file system in an existing configuration file.

A second aspect of the present disclosure provided an apparatus for multi-level data protection in a storage system, the storage system comprising a first storage device, a second storage device, and a third storage device, the apparatus comprising: a synchronous replication unit configured to establish a synchronous replication session between the first storage device and the second storage device for synchronously replicating data in the first storage device to the second storage device; an asynchronous replication unit configured to establish an asynchronous replication session between the first storage device and the third storage device for asynchronously replicating data in the first storage device to the third storage device; and an asynchronous replication recovering unit configured to recover the asynchronous replication by establishing an asynchronous replication session between the second storage device and the third storage device in response to a failure of the first storage device.

In one embodiment, the synchronous replication unit may be further configured to: synchronize information in the first storage device about the asynchronous replication session between the first storage device and the third storage device to the second storage device; and the apparatus may further comprise: a first clearing unit configured to clear, from the second storage device, part of information about the asynchronous replication session between the first storage device and the third storage device before establishing the asynchronous replication session between the second storage device and the third storage device.

In another embodiment, the first clearing unit may further comprise: an identifying unit configured to identify a session signature of the asynchronous replication session between the first storage device and the third storage device from the data synchronously replicated to the second storage device, and an information clearing unit configured to clear, from the second storage device, information about the asynchronous replication session indicated by the session identifier. In a further embodiment, the session signature may include a session identifier and a file system identifier, and the information clearing unit may be further configured to: clear, from the second storage device, information about the asynchronous replication session indicated by the session identifier if the file system identifier included in the session signature matches an internal file system checkpoint identifier in a control path database that is imported from the first storage device into the second storage device.

In another embodiment, the synchronous replication unit is further configured to synchronize information in the first storage device about the asynchronous replication session between the first storage device and the third storage device to the second storage device by one of: synchronizing the information in the first storage device about the asynchronous replication session between the first storage device and the third storage device as part of data to the second storage device; or synchronizing the information in the first storage device about the asynchronous replication session between the first storage device and the third storage device as part of an internal file system checkpoint to the second storage device.

In a further embodiment, the asynchronous replication unit is further configured to establish an asynchronous replication session between the second storage device and the third storage device by one of: loading a file system to the second storage device; and establishing, a file system-level asynchronous replication session between the second storage device and the third storage device.

In one embodiment, the apparatus may further comprise: a failover unit configured to perform failover by exchanging roles of the first storage device and the second storage device in the synchronous replication session, in response to a failure of the first storage device; and an file updating unit configured to, during recovery of the first storage device, clear control path database information related to the synchronous replication session from the first storage device and update a configuration file of the first storage device so as to guarantee that a file system loading process after reboot of the first storage device will not cause a rolling reboot of the system due to file system mismatch. In another embodiment, the file updating unit may be configured to update the configuration file of the first storage device by modifying a loading item of a file system in an existing configuration file.

A third aspect of the present disclosure provides an apparatus, the apparatus comprising at least one processor; and at least one memory including computer program code, wherein the at least one memory and the computer program code are configured to, with the at least one processor, cause the apparatus to perform the method according to the first aspect of the present disclosure.

By virtue of the methods or apparatus of the embodiments of the present disclosure, synchronous and asynchronous replication technologies may be simultaneously utilized to provide local and remote multi-level data protection.

Although specific embodiments have been illustrated by way of example in the accompanying drawings, it should be understood that the description of the particular embodiments is not intended to limit the embodiments to the specific form being disclosed.

BRIEF DESCRIPTION OF THE DRAWINGS

The objectives, advantages and other features of the present disclosure will become more apparent from the disclosure below and the claims. Here, non-limiting depiction of the example embodiments will be provided for illustration purposes only, with reference to the accompanying drawings, in which:

DETAILED DESCRIPTION OF EMBODIMENTS

In the description below, many details are depicted for the purpose of illustration. However, a person of normal skill in the art will appreciate that embodiments of the present disclosure may be implemented without using these specific details. Therefore, the present disclosure is not intended to be limited to the embodiments illustrated, but will be granted a broadest scope consistent with the principle and feature described herein.

It should be understood that the terms "first" and "second" are only used to distinguish one element from another element. Actually, the first element can also be referred to as the second element, and vice versa. In addition, it should also be understood that the expressions "comprise," "comprising," "include" and "including" are only used to illustrate presence of features, elements, functions or components as stated, but do not exclude presence of one or more other features, elements, functions or components.

In order to facilitate explanation, some embodiments of the present disclosure will introduce a corresponding method or apparatus using the VNX2 product of the EMC™ Company as an example. However, those skilled in the art can understand that the embodiments of the present disclosure are in no way limited to being applied to the VNX2 product only, but may be applied to any storage system having a similar problem.

As previously mentioned, there is no solution that enables co-existence of synchronous replication and asynchronous replication in the prior art. For example, in the VNX2 storage product, a replicator V2 (abbr. Repv2) may be provided for asynchronous replication, or a virtual data mover (abbr. VDM) for synchronous replication.

In order to enable coexistence of the synchronous replication and asynchronous replication so as to leverage the advantages of both, many problems should be addressed, e.g., how to enable cooperation between the synchronous replication and asynchronous replication in a storage system, and how to recover the session upon failure, etc.

Figure 1:
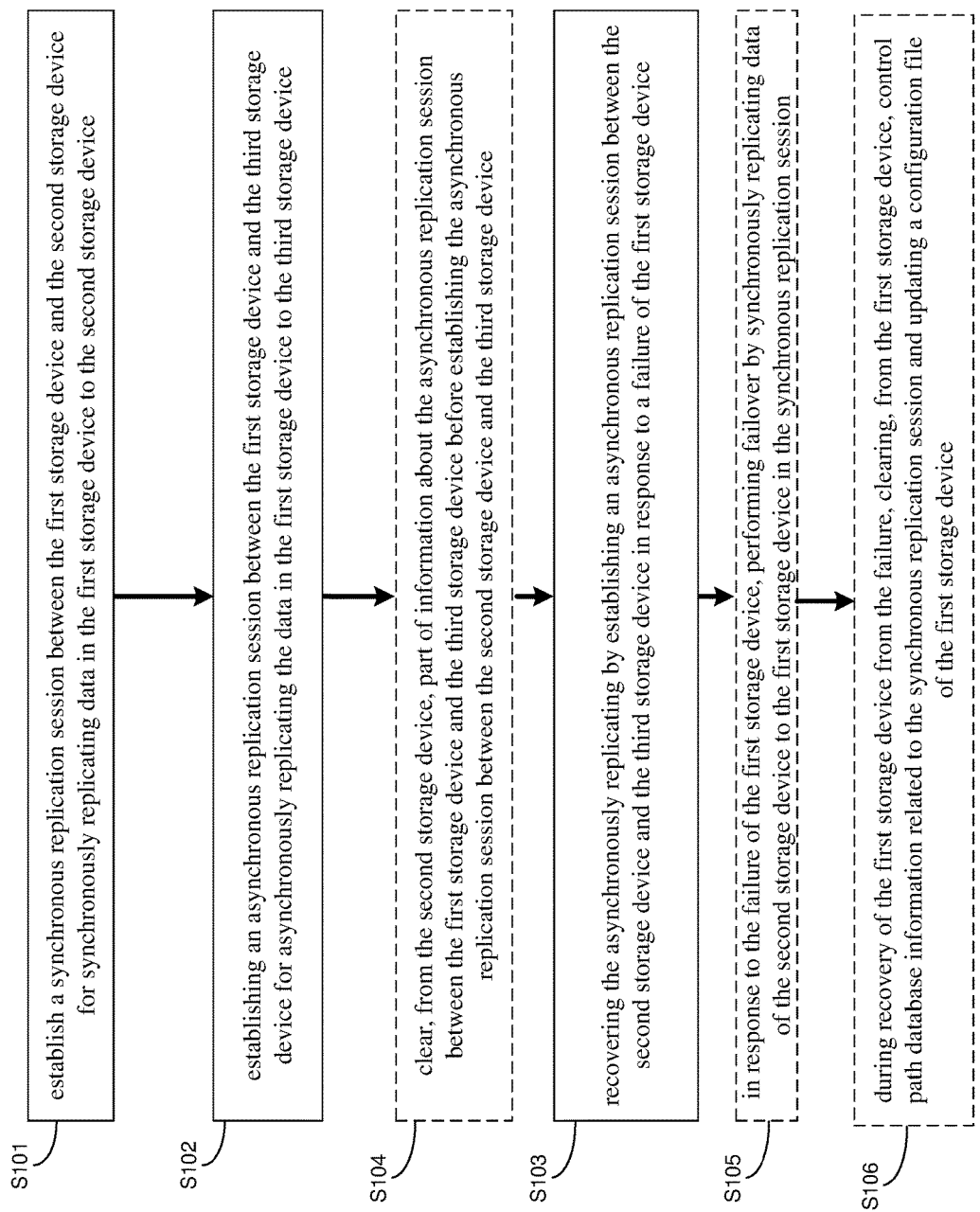
FIG. 1 illustrates a flow chart of a method for multi-level data protection in a storage system according to embodiments of the present disclosure.

In order to address at least some of the above problems, embodiments of the present disclosure provide a method for multi-level data protection in a storage system. FIG. 1 illustrates an example flow chart of the method 100. The storage system comprises a first storage device, a second storage device, and a third storage device, wherein the storage system may be, but not limited to, a VNX2 storage system, and the storage device therein may be (but not limited to) a storage array.

As illustrated in FIG. 1, the method 100 comprises: establishing a synchronous replication session between a first storage device and a second storage device at S101, for synchronously replicating data in the first storage device to the second storage device; this means the data in the first storage device can be replicated to the second storage device with a low delay; at S102, establishing an asynchronous replication session between the first storage device and the third storage device for asynchronously replicating the data in the first storage device to the third storage device; due to a relatively large time delay of the asynchronous replication, this means that information of the first storage device as saved in the third storage device might not be the latest; at S103, recovering the asynchronous replication by establishing an asynchronous replication session between the second storage device and the third storage device in response to a failure of the first storage device.

Figure 2A:
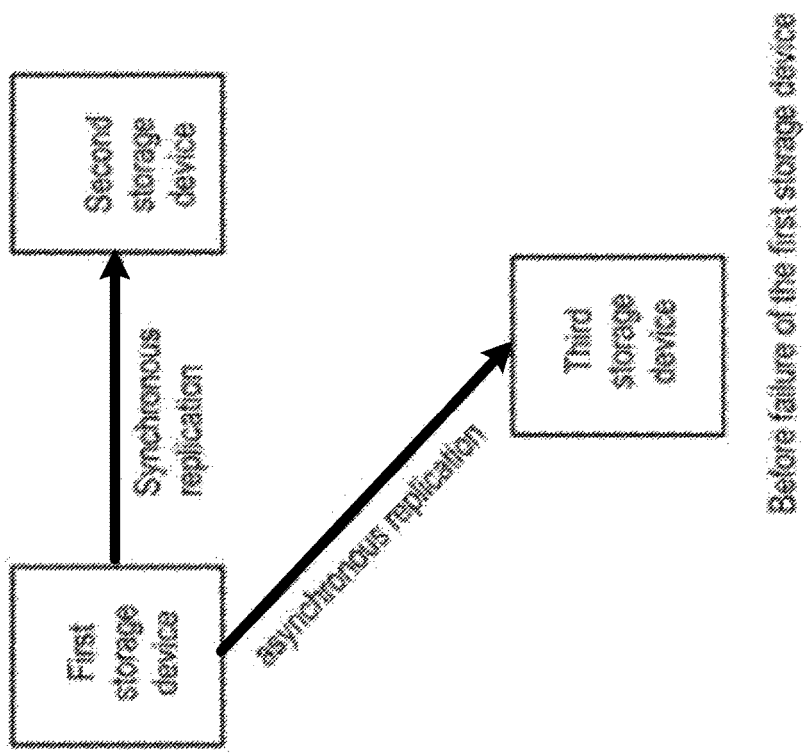
FIGS. 2a-2b illustrate schematic diagrams of data protection before failure of the first storage device and during the failure.
Figure 2B:
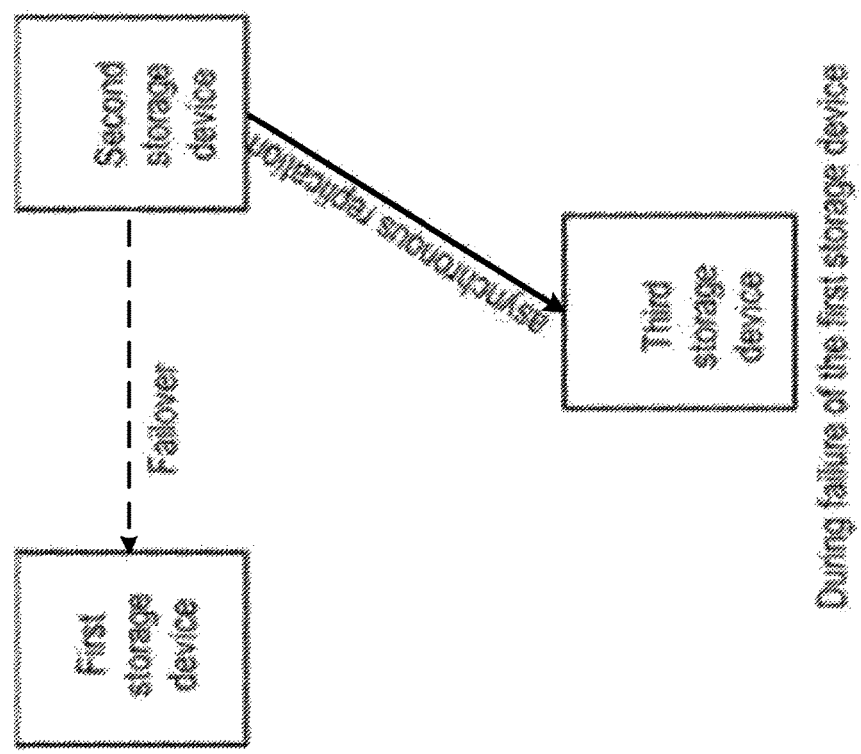

FIGS. 2a-2b schematically illustrate a schematic diagram of data protection before and during the failure of a storage system using the method 100.

Through this method, local and remote dual-level data protection, e.g., file protection, is provided in the storage system. As can be understood by those skilled in the art, the method may also be applied to a storage system with more storage devices. Through this method, a mechanism for cooperating between synchronous replication and asynchronous replication is provided; moreover, in response to a failure of the first storage device, data of the first device as saved in the second storage device may be asynchronously replicated to the third storage device.

In one embodiment, at block S103, establishing an asynchronous replication session between the second storage device and the third device in response to a failure of the first storage device may comprise: loading/mounting a file system to the second storage device; and establishing a file system-level asynchronous replication session between the second storage device and the third storage device.

Currently, there is no solution that simultaneously leverages synchronous replication and asynchronous replication like the method 100. With the traditional VNX2 product as an example, due to at least some of the following reasons, it cannot support coexistence of synchronous replication and asynchronous replication:

1. In traditional VNX2, a VDN that enables synchronous replication cannot create a file system (FS)-level asynchronous replication Repv2 session. If a synchronous replication is established between the storage device A and the storage device B, while an asynchronous replication is established between the storage device A and the storage device C is established at the same time, if the storage device A fails, the synchronous replication will perform failover from the storage device A to the storage device B. This causes that the file system data of the VDM will be synchronized to the storage device B side, and a network attach storage database (NASDB) will be imported from a NASDB replica control logic unit (Control LUN). However, because information from the storage device A about the asynchronous replication session (Repv2) between device A and device C exists in the data path database (e.g., save volume) of the storage device B, the file system will be unable to be loaded in the VDM of the storage device B.

2. In this case, the FS Repv2 synchronized from the storage device A is broken; moreover, the Repv2 cannot be deleted through a traditional nas_replicate command, because the synchronous replication feature (Syncrep) only failover the VDM data to the storage device B. The VDM data includes a VDM root file system and a user file system, but does not include a root file system of an operating system DART. Therefore, in the storage device B, the database NameDB in the root file system of DART has not stored the Repv2 session information.

3. After the Syncrep failover occurs, the original source storage device (i.e., A) is recovered from the failure. At this point, because the storage device A is in a standby state after failover, its LUN block is in a read-only state, and then during the device reboot procedure, loading/mounting the file system to the LUN block will fail and cause a rolling reboot of the system.

Optionally, in order to implement the local and remote dual-level data protection using an existing storage device (e.g., VNX2), in some embodiments, at block S101 of the method 100, the information in the first storage device about the asynchronous replication session between the first storage device and the third storage device (e.g., Repv2 information) may also be synchronized to the second storage device. In these embodiments, the method 100 may further comprise: at block S104, before establishing an asynchronous replication session between the second storage device and the third storage device, clearing part of information about the synchronous replication session between the first storage device and the third storage device from the second storage device. This embodiment can delete, by force, the information in the second storage device which is adverse to establishing an asynchronous session between the second device and the third device.

In one embodiment, at block S101, the information in the first storage device about the asynchronous replication session between the first storage device and the third storage device may be synchronized to the second storage device as part of data; or synchronized to the second storage device as part of an internal file system checkpoint.

In another embodiment, when implementing the method using the VNX2 storage product described above, in order to load a file system in the VDM of the second storage device, at block S104, information about the asynchronous replication session between the first and third storage devices that obstructs file loading may be cleared from the second device. However, the remaining information that does not obstruct loading of file system, may be retained. The information that is deleted by force may be for example, information about the broken Repv2 between the first and third storage device which cannot be deleted through a traditional nas_replicate command.

As can be understood by those skilled in the art, the information cleared at S104 may be different dependent on different storage systems to which the method is applied, and for some storage systems, the clearing operation may not be needed.

In another embodiment, clearing the information about the asynchronous replication session between the first storage device and the third storage device from the second storage device at block S104 may comprise: identifying a session signature of the asynchronous replication session between the first storage device and the third storage device in the data synchronously replicated to the second storage device, and clearing, from the second storage device, the information about the asynchronous replication session indicated by the session signature.

In another embodiment, the session signature may comprise a session identifier (Session ID) and a file system identifier (FS ID); and at block S104, if the FS ID included in the session signature matches an internal file system checkpoint FS ID in a control path database (e.g., network attach system database NASDB) imported from the first storage device into the second storage device, clearing, from the second storage device, the information about the asynchronous replication session indicated by the session identifier. For another example, by matching the information stored in a save volume of the second storage device to the information stored in the NASDB of the control station in the second storage device and calculating a correct DART, a broken Repv2 is deleted using the DART with an appropriate parameter. After deleting the Repv2, the file system may be loaded into the VDM of the second storage device so as to continue to provide data services.

As can be understood by those skilled in the art in another embodiment, the information cleared from the second storage device may also be indicated by other identifier, e.g., a connection ID, a target address ID, etc.

In one embodiment, the method 100 may also comprise: at block S105, in response to a failure of the first storage device, failover is performed by exchanging roles of the first storage device and the second storage device during a synchronous replication session. For example, role exchanging may include replicating data in the second storage device to the first storage device during the synchronous replication session. As an example, the failover may include switching the first storage device from an active state to a standby state, and meanwhile switching the second storage device from the standby state to the active state.

At block S106, during recovery of the first storage device, control path database information related to the synchronous replication session is cleared from the first storage device, and a configuration file of the first storage device is updated. This facilitates ensuring that file system loading process after reboot of the first storage device will not cause rolling reboot of the system due to file system mismatch. In one embodiment, the configuration files of the first storage device may be updated by modifying a loading item of a file system in an existing configuration file.

As mentioned above, without the method 100 of the present disclosure, after failover of the first storage device, once the first storage device is recovered from the failure, rolling reboot might occur if the first storage device attempts to load the file system after reboot. This is because the first storage device is in a standby state after failover, and its LUN block is in a read-only state. However, because its VDM is loaded with the file system, and then performing a write operation of loading file system after reboot will trigger another reboot. However, using some embodiments of the method 100 of the present disclosure, the problem may be solved by clearing a file system NASDB entry related to the synchronous session from the control station of the first storage device without interconnecting with the DART. The control station may build a new configuration file (e.g., boot.cfg), e.g., building a new configuration file by modifying a load item of a file system in an existing configuration file; in this way, after the DART is rebooted, the file system can be loaded based on the new configuration file, thereby avoiding rolling reboot.

Hereinafter, a structure of the apparatus 300 for multi-level data protection in the storage system will be described with reference to FIG. 3. The storage system to which the apparatus 300 is applicable comprises a plurality of storage devices, e.g., a first storage device, a second storage device, and a third storage device. For example, the storage system may be (but not limited to) a VNX2 system. The apparatus 300 may perform the method 100 described with reference to FIG. 1, but not limited to the method 100. Likewise, the method 100 may be executed by the apparatus 300, but not limited to being executed by the apparatus 300. For example, at least some operations of the method 100 may be executed by other apparatus.

In one embodiment, the apparatus 300 comprises a synchronous replication unit 301 configured to establish a synchronous replication session between the first storage device and the second storage device so as to synchronously replicate the data in the first storage device to the second storage device; an asynchronous replication unit 302 configured to establish an asynchronous replication session between the first storage device and the third storage device so as to asynchronously replicate the data in the first storage device to the third storage device; and an asynchronous replication recovery unit 303 configured to establish an asynchronous replication session between the second storage device and the third storage device in response to a failure of the first storage device, so as to recover the asynchronous replication.

In one embodiment, units 301-303 may be configured to perform operations S101-S103 of the method 100 with reference to FIG. 1. Therefore, relevant depiction provided with reference to the method 100 is also applicable here.

In one embodiment, the synchronous replication unit 301 is further configured to also synchronize the information in the first storage device about the asynchronous replication session between the first storage device and the third storage device to the second storage device; and the apparatus 300 may further comprise: a first clearing unit 304 configured to clear part of information about the asynchronous replication session between the first storage device and the third storage device from the second storage device, before establishing an asynchronous replication session between the second storage device and the third storage device.

In one embodiment, an operation of the block S104 described with reference to the method 100 is also applicable here to the first clearing unit 304, and therefore will not be detailed here.

In another embodiment, the first clearing unit may further comprise: an identifying unit 3041 configured to identify a session signature of the asynchronous replication session between the first storage device and the third storage device from the data synchronously replicated to the second storage device, and an information clearing unit 3042 configured to clear, from the second storage device, the information about the asynchronous replication session indicated by the session signature.

In a further embodiment, the session signature may comprise a session identifier and a file system identifier, and the information clearing unit 3042 may be further configured to clear, from the second storage device, the information about the asynchronous replication session as indicated by the session identifier, if the file system identifier included in the session signature matches an internal file system checkpoint identifier in a control path database imported from the first storage device into the second storage device.

As an example, the synchronous replication unit 301 may be further configured to synchronize information in the first storage device about the asynchronous replication session between the first storage device and the third storage device to the second storage device through one of the following manners: synchronizing the information in the first storage device about the asynchronous replication session between the first storage device and the third storage device as part of data to the second storage device; or synchronizing the information in the first storage device about the asynchronous replication session between the first storage device and the third storage device as part of an internal file system checkpoint to the second storage device.

As a further embodiment, the asynchronous replication unit is further configured to establish an asynchronous replication session between the second storage device and the third storage device through one of the following manners: loading a file system to the second storage device; and establishing a file system-level asynchronous replication session between the second storage device and the third storage device.

Additionally or alternatively, the apparatus 300 may comprise a failover unit 305 configured to perform failover by exchanging roles of the first storage device and the second storage device during the synchronous replication session in response to a failure of the first storage device; and a file updating unit 306 configured to, during recovery of the first storage device, clear control path database information related to the synchronous replication session from the first storage device and update a configuration file of the first storage device, so as to guarantee that a file system loading process after reboot of the first storage device will not cause rolling reboot of the system due to file system mismatch.

In one embodiment, the file updating unit may be configured to update the configuration file of the first storage device by modifying a loading item of a file system in an existing configuration file.

In one embodiment, operations of the blocks S105-S106 described with reference to the method 100 are also applicable here to the units 305 and 306, and therefore will not be detailed here.

Figure 3:
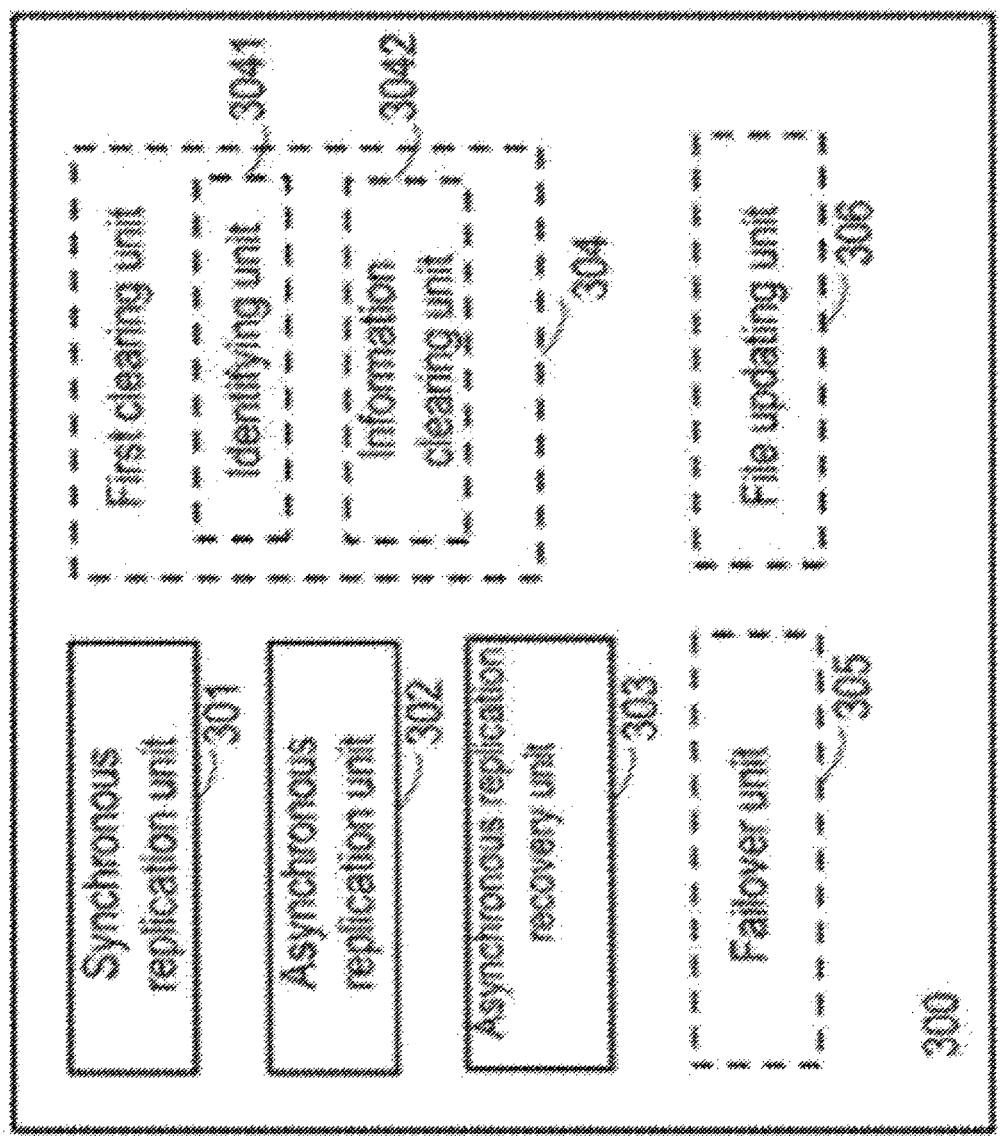
FIG. 3 illustrates an example structural diagram of an apparatus according to embodiments of the present disclosure.

As can be understood by those skilled in the art, the apparatus 300 may also comprise other units not shown in FIG. 3; and in some embodiments, some units in FIG. 3 may be omitted.

Before providing the method and apparatus according to the embodiments of the present disclosure, there were no solutions for local and remote multi-level data protection in the storage system. For example, data protection performed using VNX Repv 2 is asynchronous, and if disaster occurs, data lost might occur at the target storage device side. For data protected by VNX synchronously replication, VDM, it is subject to a distance limitation (e.g., 40 km). Therefore, it can only recover from failure such as power down in a lab. However, if a large-scale disaster like earthquake or flood occurs, two storage device sites might both suffer the disaster due to short distance there-between, such that both storage devices cannot work, causing interruption of data service.

With method and apparatus of embodiments of the present disclosure, coexistence of local and remote replications, e.g., co-existence of the synchronous replication and asynchronous replication in the VNX, can be enabled. This not only enables real-time data protection, but also enables data protection within a distance of hundreds of kilometers. According to some embodiments, a synchronous replication session technology can be utilized during the recovery of asynchronous replication, so as to avoid the initial replication phase and shorten the recovery time. With some embodiments, an integrated solution that enables both file-level and block-level data protection can be provided.

Through the method and/or apparatus according to some embodiments of the present disclosure, the user can create a synchronous session for the VDM, and create a Repv2 session for the file system loaded in the VDM.

Through the method and/or apparatus according to some embodiments of the present disclosure, the storage system can provide failover for VDM synchronous replication if disaster occurs, and resume the FS asynchronous replication session after failover, thereby providing local and remote multi-level data protection.

Those skilled in the art will easily appreciate that the blocks or steps in various methods above may be executed through a programmed computer. In the present disclosure, some embodiments are also intended to cover a program storage system, e.g., a digital data storage medium. It stores an instruction program that is readable by a machine or a computer and executable by an encoding machine or computer, wherein the instruction executes some or all steps of the method above. The program storage system may be, for example, a digital memory, a magnetic storage medium such as a magnetic disk or magnetic tape, a hard disk driver or an optical readable digital data storage medium. The embodiment is also intended to cover a computer programmed to execute steps of the method above. Some embodiments are also intended to cover an apparatus that comprises at least one processor; and at least one memory including computer program codes, wherein the at least one memory and the computer program codes are configured to, with the at least one processor, cause the apparatus to execute the method 100.

Functions of various elements of the apparatus illustrated in the drawings may be provided through software, dedicated hardware, and hardware associated with appropriate software and capable of executing the software, or firmware or a combination thereof. If provided by the processor, the function may be provided by a single dedicated processor, a single shared processor, or a plurality of separate processors. Besides, the terms "processor" may comprise, but not limited to, a digital signal processor (DSP) hardware, a network processor, an application specific integrated circuit (ASIC), a field-programmable gate array (FPGA), a read-only memory (ROM) for storing software, a random-access memory (RAM), and a non-volatile storage device. It may also comprise other conventional and/or customized hardware.

Those skilled in the art should understand that the specification and drawings are only for illustrating the principle of the embodiments of the present disclosure. Therefore, it should be appreciated that those skilled in the art can design various arrangements which, though not explicitly described or illustrated, embody the principle of the embodiments of the present disclosure and are included within the spirit and scope of the embodiments of the present disclosure. Besides, all the examples recited herein are mainly used for the teaching purpose to aid readers in understanding the principles of the present disclosure and the concepts contributed by the inventor and to further the present field, and it should be construed as not being restricted to the specifically recited examples and conditions. Besides, all the illustration and the specific embodiments of the principles, aspects and embodiments of the present disclosure also intend to cover the counterparts thereof.

What is claimed is:

1. A method for multi-level data protection in a storage system, the storage system including a first storage device, a second storage device, and a third storage device, the method comprising:
   establishing a synchronous replication session between the first storage device and the second storage device for synchronously replicating data in the first storage device to the second storage device;
   establishing an asynchronous replication session between the first storage device and the third storage device for asynchronously replicating the data in the first storage device to the third storage device;
   in response to a failure of the first storage device, recovering the asynchronously replicating by establishing an asynchronous replication session between the second storage device and the third storage device;
   in response to the failure of the first storage device, performing failover by synchronously replicating data of the second storage device to the first storage device in the synchronous replication session; and
   during recovery of the first storage device from the failure, clearing, from the first storage device, control path database information related to the synchronous replication session and updating a configuration file of the first storage device.

2. The method according to claim 1, wherein: the synchronously replicating data in the first storage device to the second storage device comprises synchronizing information in the first storage device about the asynchronous replication session between the first storage device and the third storage device to the second storage device; and the method further comprises: clearing, from the second storage device, part of information about the asynchronous replication session between the first storage device and the third storage device before establishing the asynchronous replication session between the second storage device and the third storage device.

3. The method according to claim 2, wherein the clearing, from the second storage device, part of the information about the asynchronous replication session between the first storage device and the third storage device comprises: identifying a session signature of the asynchronous replication session between the first storage device and the third storage device from data synchronously replicated to the second storage device, and clearing, from the second storage device, information about the asynchronous replication session indicated by the session signature.

4. The method according to claim 3, wherein the session signature includes a session identifier and a file system identifier, and the clearing, from the second storage device, the information about the asynchronous replication session indicated by the session signature comprises: clearing, from the second storage device, the information about the asynchronous replication session indicated by the session identifier, if the file system identifier included in the session signature matches an internal file system checkpoint identifier in a control path database synchronously replicated from the first storage device into the second storage device.

5. The method according to claim 2, wherein the synchronizing the information in the first storage device about the asynchronous replication session between the first storage device and the third storage device to the second storage device comprises:
   synchronizing the information in the first storage device about the asynchronous replication session between the first storage device and the third storage device as part of data to the second storage device; or
   synchronizing the information in the first storage device about the asynchronous replication session between the first storage device and the third storage device as part of an internal file system checkpoint to the second storage device.

6. The method according to claim 1, wherein the establishing an asynchronous replication session between the second storage device and the third storage device comprises:
   loading a file system to the second storage device; and
   establishing a file system-level asynchronous replication session between the second storage device and the third storage device.

7. The method according to claim 1, wherein the updating a configuration file of the first storage device comprises: modifying a loading item of a file system in an existing configuration file.

8. An apparatus for multi-level data protection in a storage system, the storage system including a first storage device, a second storage device, and a third storage device, the apparatus including one or more processors and one or more memories configured to perform operations comprising:
   establishing a synchronous replication session between the first storage device and the second storage device for synchronously replicating data in the first storage device to the second storage device;
   establishing an asynchronous replication session between the first storage device and the third storage device for asynchronously replicating the data in the first storage device to the third storage device;
   in response to a failure of the first storage device, recovering the asynchronous replication by establishing an asynchronous replication session between the second storage device and the third storage device;
   in response to the failure of the first storage device, performing failover by synchronously replicating data of the second storage device to the first storage device in the synchronous replication session; and during recovery of the first storage device from the failure, clearing, from the first storage device, control path database information related to the synchronous replication session and updating a configuration file of the first storage device.

9. The apparatus according to claim 8, wherein the operations further comprise:

synchronizing information in the first storage device about the asynchronous replication session between the first storage device and the third storage device to the second storage device;

clearing, from the second storage device, part of information about the asynchronous replication session between the first storage device and the third storage device before establishing the asynchronous replication session between the second storage device and the third storage device.

10. The apparatus according to claim 9, wherein operations further comprise:

identifying a session signature of the asynchronous replication session between the first storage device and the third storage device from data synchronously replicated to the second storage device, and clearing, from the second storage device, information about the asynchronous replication session indicated by the session signature.

11. The apparatus according to claim 10, wherein the session signature includes a session identifier and a file system identifier, and wherein the operations further comprise clearing, from the second storage device, the information about the asynchronous replication session indicated by the session identifier, if the file system identifier included in the session signature matches an internal file system checkpoint identifier in a control path database synchronously replicated from the first storage device into the second storage device.

12. The apparatus according to claim 9, wherein the operations further comprise:

synchronizing the information in the first storage device about the asynchronous replication session between the first storage device and the third storage device to the second storage device by one of:

synchronizing the information in the first storage device about the asynchronous replication session between the first storage device and the third storage device as part of data to the second storage device; and synchronizing the information in the first storage device about the asynchronous replication session between the first storage device and the third storage device as part of an internal file system checkpoint to the second storage device.

13. The apparatus according to claim 8, wherein the operations further comprise:

establishing an asynchronous replication session between the second storage device and the third storage device by:

loading a file system to the second storage device; and
establishing a file system-level asynchronous replication session between the second storage device and the third storage device.

14. The apparatus according to claim 8, wherein the operations further comprise updating the configuration file of the first storage device by modifying a loading item of a file system in an existing configuration file.

15. A computer program product for providing multi-level data protection in a storage system, the storage system including a first storage device, a second storage device, and a third storage device, the computer program product comprising:

a non-transitory computer readable medium encoded with computer-executable code, the code configured to enable the execution of:

establishing a synchronous replication session between the first storage device and the second storage device for synchronously replicating data in the first storage device to the second storage device;

establishing an asynchronous replication session between the first storage device and the third storage device for asynchronously replicating the data in the first storage device to the third storage device;

in response to a failure of the first storage device, recovering the asynchronously replicating by establishing an asynchronous replication session between the second storage device and the third storage device;

in response to the failure of the first storage device, performing failover by synchronously replicating data of the second storage device to the first storage device in the synchronous replication session; and during recovery of the first storage device from the failure, clearing, from the first storage device, control path database information related to the synchronous replication session and updating a configuration file of the first storage device.

16. The computer program product according to claim 15, wherein:

the synchronously replicating data in the first storage device to the second storage device comprises synchronizing information in the first storage device about the asynchronous replication session between the first storage device and the third storage device to the second storage device; and wherein the code is further configured to enable the execution of:

clearing, from the second storage device, part of information about the asynchronous replication session between the first storage device and the third storage device before establishing the asynchronous replication session between the second storage device and the third storage device.

17. The computer program product according to claim 16, wherein the clearing, from the second storage device, part of the information about the asynchronous replication session between the first storage device and the third storage device comprises: identifying a session signature of the asynchronous replication session between the first storage device and the third storage device from data synchronously replicated to the second storage device, and clearing, from the second storage device, information about the asynchronous replication session indicated by the session signature.

18. The computer program product according to claim 17, wherein the session signature includes a session identifier and a file system identifier, and the clearing, from the second storage device, the information about the asynchronous replication session indicated by the session signature comprises: clearing, from the second storage device, the information about the asynchronous replication session indicated by the session identifier, if the file system identifier included in the session signature matches an internal file system checkpoint identifier in a control path database synchronously replicated from the first storage device into the second storage device.

\* \* \* \* \*